Aug. 30, 1927.

A. G. F. KUROWSKI 1,640,841

TYPEWRITING MACHINE

Filed June 7, 1924

INVENTOR.

Alfred G. F. Kurowski

BY B.C. Stickney

HIS ATTORNEY.

Patented Aug. 30, 1927.

1,640,841

UNITED STATES PATENT OFFICE.

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

Application filed June 7, 1924. Serial No. 718,468.

This invention relates to carriage-feeding means for typewriting machines, and more particularly to that class where the escapement devices are operated by the type-bars striking a curved universal bar mounted upon the type-bar segment, and in which the printing plane of the type-faces is rearwardly inclined.

In usual carriage-feeding mechanisms the carriage-feed rack is in mesh with a pinion connected with an escapement wheel by a ratchet-and-pawl construction, which permits the pinion to rotate independently of the wheel when the carriage is reversed or moved to the right. Such ratchet-and-pawl construction is almost universally employed as a means to permit a right-hand movement of the carriage, while the escapement wheel remains inactive, and constitutes a noisy combination due to the constant clicking of the pawl riding over the ratchet teeth; hence one object of this invention is to dispense with both ratchet and pawl, and provide a pinion and escapement wheel formed as a single unit, and mount the stepping dog in such a manner that its movement in one direction will be arrested by a fixed stop, and in the opposite direction by a flexible stop formed by the actuating spring assuming a position of equipoise in reference to its control over the dog.

When the stepping dog is released by the escapement-wheel teeth to the action of the spring, the pull of the spring will swing the free end of the dog to a position to intercept the advancing tooth of the escapement-wheel and the dog is moved back into the path of the rotating teeth of said wheel. This flexible stop position for the dog may be varied by shifting or adjusting the point where the end of the spring is anchored.

When the carriage is moved to the right-hand the teeth of the escapement wheel are aligned to the plane of the stepping dog, and will push the dog beyond its normal stepping position, during which operation the dog will ride over each tooth of the wheel in succession; when the carriage is arrested by the right-hand margin-stop and released, to the action of the spring motor, one tooth will engage the dog and force it against its fixed stop to indicate a fixed letter-space position for the commencement of a new line; or, in other words, the stepping dog of the escapement that promotes letter-space movements of the carriage, at each type impact against the platen, is spring-pressed in two directions toward the neutral point, where the dog intercepts the advancing tooth of the escapement-wheel.

Other features and advantages will hereinafter appear.

In the accompanying drawings,

Figure 1 is a vertical sectional view taken transversely through the center of the machine, certain parts being omitted and showing the application of the invention.

Figure 2 is a partial plan view of some of the escapement mechanism, the view being taken in a plane indicated by the line X of Figure 1.

Figure 3 is a front elevation of some of the parts shown at Figure 2.

Figure 4 is a sectional view of the escapement-wheel and its support.

Figure 5 is a plan view of the carriage motor.

Figure 6 is a central sectional view through Figure 5.

Figure 7 is a two-position view, showing the action of the stepping dog.

Figure 8 is a diagrammatic view, showing the co-operative action between the teeth of the escapement-wheel and its associated escapement dogs.

Key-levers 10 are arranged on a key-board of the usual style to actuate cranks 11 about a stationary pivot 12, and which are connected by pull rods 13 to type-bars 14 that swing upon a pivot-wire 15, curved around the outer edge of a type-bar segment 16, which is fixedly supported on the main frame of the typewriting machine. Each type-bar is guided by radial slots formed in the type-bar segment 16, so that the type thereon will strike the front face of a revoluble platen 17 at a common printing point. The platen 17 is mounted upon a platen-shaft 18, journaled in bearings in a carriage composed of two end plates 19, joined together by a base plate 20. This base plate, at both longitudinal edges, is folded to form raceways 21 co-operating with similar but reversed raceways 22 formed in stationary carriage rails 23 secured to the shift frame of the carriage.

A lever 24 is pivoted to each carriage-end 19 in such a manner that one end of the lever passes down through an opening in the base plate 20, to support a carriage-feed rack 25. Each lever 24 is formed with a short arm 26, operating within the slotted end of a release lever 27, pivotally mounted upon the platen-shaft 18 at each carriage-end, and each lever terminating at a finger-piece or pad 28 extending into a depression 29 in the flanged upper edge of the carriage-ends 19, thereby avoiding accidental actuation of the lever but permitting operation when required.

To co-operate with the feed-rack 25, an escapement-pinion 30 is mounted upon a stationary stud 31, as shown at Figure 4, and is permanently fixed to a carriage back plate 32. The pinion 30 is reduced at one end to form a shoulder to receive an escapement-wheel 33, that may be staked thereto, or permanently fixed in any other manner so that the wheel and pinion will rotate in unison, and to maintain the pinion upon its stationary stud 31, the end of the stud may be threaded to receive a screw 34.

To co-operate with the escapement-wheel 33, a holding dog 35 is formed at the upper edge of a dog-rocker 36 arranged to move the dog between the teeth of the escapement-wheel by swinging upon pivots 37 at each side, the dog-rocker being normally held against a fixed stop 49 by a coiled compression spring 50, extended between its under surface and the carriage back plate 32. A stepping dog 38 is mounted upon a stud 39, fixed at the rear face of the rocker 36, and is provided with a short arm 40 to receive a pin 41 engaging one end of a spring 42, the other end of the spring being engaged by a raised wire post 43 secured to the outer face of the rocker 36 in such a manner that the free outer end of the post may be bent either way to change the relation of the spring 42 to the dog 38 in normal position.

A tooth of the escapement-wheel 33, as shown in Figure 3, is in engagement with the stepping dog, and due to the abutment of the dog 38 against a stop 44 fixed in the dog-rocker 36, the carriage is held stationary.

A curved universal bar 45, operated by a cam-shaped part 46 of each type-bar, at each stroke, is moved rearwardly by its connection to a frame 47, provided with a bearing at the front end within the segment 16, the rear end of the frame being suspended by two links 48 dropping downwardly from ears on the back bar of the machine. This frame 47, by reason of its connections as described, has practically a straight line movement at right-angles to the plane of the segment, and is provided with an adjustable finger 52 to strike an arm 53 fixed to the face of the dog-rocker 36, and, by contact therewith, cause the rocker 36 to oscillate in unison with the movement of the frame 47. The adjusted finger 52 is sufficiently long to always be in effective relation with the dog-rocker 36, irrespective of the fact that the dog-rocker shifts up and down with the shift-frame during case-shifting movement of the platen. To hold the frame 47 in a normal forward position against an adjustable stop 54, a spring 55 is connected to the frame at one end, and fixed to a stationary bell-crank arm 56 secured to the frame of the machine, this arm also carrying the adjustable stop 54, thus providing a very compact arrangement of the universal bar supporting frame, the pivoted arms to which it is connected, and the escapement mechanism, including the dog-rocker and escapement wheel.

As shown at Figures 5 and 6 the carriage motor comprises a flanged drum 57, chambered to house a flat, spirally coiled spring 51, having one end secured to the drum, and the opposite end secured to a stud 58, which has bearing in a bracket 59, secured to the inclined back-plate 32, in such manner that the face of the bracket is vertical with respect to the plane of the machine. At the extreme end of the stud 58, inside the bracket 59, is a worm-gear 60, mounted in such a manner that it will rotate the stud 58 to wind or unwind the spring. To co-operate with this worm-gear 60 a worm 61 is mounted rotatably within the bracket 59, the worm having a slotted head 62 by which it may be turned, and to maintain the worm in position a collar 63 is pinned to the worm.

The drum 57 is provided with a shouldered stud 64 to receive one end of a tape 65 that connects with a hook 66 at the right-hand carriage end 19.

At Figure 8, A, B and C indicate three stepping positions of the tooth of the escapement-wheel. At A is shown the normal position of both dogs 35 and 38. The direction of the teeth of the escapement-wheel 33 is indicated by the arrow X, and the direction of the carriage feed indicated by the arrow Y. At B, it is assumed that the rocker 36 has moved the stepping dog 38 clear of the escapement-wheel tooth, which is shown in engagement with the holding dog 35, and the stepping dog moved to the left-hand to a position to intercept the next advancing tooth of the wheel. At C the escapement dogs have moved forwardly in the direction of Z until the teeth are about to leave the control of the holding dog 35, and it will be seen in this view that the stepping dog 38 is moved forwardly far enough to enter the plane of the next advancing tooth of the wheel 33, so that when the wheel is entirely free of the holding dog 35, the stepping dog 38 will positively engage the advancing tooth.

In most carriage-feeding mechanisms the stepping dog moves between two stop positions, one position when the teeth of the escapement-wheel is in engagement therewith, and the other position when it is released by the teeth, and its spring throws it forward to pass just in front of the next advancing tooth of the wheel. In such construction, when the carriage is thrown to the right the stepping dog will be vibrated to its stop position, but the movement thereof will not be sufficient to allow the teeth of the escapement wheel to pass, and the carriage will become locked by engagement of the stepping dog between two adjoining teeth of the escapement-wheel.

To avoid such condition as this, the escapement pinion and the escapement-wheel are usually provided with a pawl-and-ratchet construction, so that when the carriage is moved to the right and the stepping dog is moved as far as its stop, said dog, instead of locking the carriage, simply holds the escapement-wheel in this position and allows the pinion 30 to be rotated independently of the escapement-wheel by its connection with the carriage-feed rack 25. In this case, however, the pinion 30 and the escapement-wheel 33 are joined as a single unit, and to provide a means to allow the stepping dog 38 to perform its usual function in a letter-space direction, and also to permit the carriage being moved to the right-hand without locking or interfering with the rotary movement of the escapement-wheel, the stepping dog assumes a fixed position relative to the post or anchorage 43 of the spring. When the carriage is moved towards the right for the commencement of a new line, and the rotation of the escapement wheel 33 is reversed, the teeth of the wheel come in contact with the beveled face of the dog 38, causing the dog to let the tooth pass and immediately swing back to normal or full line position through the influence of the spring 42.

From this description it will be seen that the action of the spring 42 tends to throw the dog 38 to a central or neutral position and that this neutral position may be slightly changed by bending the end of the post 43 to either side, which will change the axial plane of the spring 42.

Variations may be resorted to within the scope of the invention, and portions of the improvement may be used without others.

Having thus described my invention, I claim:

1. In a typewriting machine having a typing system tilted to incline the printing plane of the type-faces rearwardly, a carriage, carriage-feeding mechanism including an escapement-wheel and a coaxial pinion rigid therewith journaled on an axis perpendicular to said printing plane, a rack-bar supported by the carriage to engage the pinion, a stepping dog co-operating with the escapement-wheel, a stop to define the checking position of the dog, and a spring to maintain the dog in equipoise at its stepping position by the alignment of the spring and its point of connection to the dog to a straight line that bisects the axis of the dog.

2. In a typewriting machine having a typing system tilted to incline the printing plane of the type-faces rearwardly, a carriage, carriage-feeding mechanism including an escapement-wheel and a coaxial pinion rigid therewith journaled on an axis perpendicular to said printing plane, a rack-bar supported by the carriage for engaging the pinion, a stepping dog co-operating with the escapement-wheel, a stop to define the checking position of the dog, a spring to maintain the dog in equipoise at its stepping position by the alignment of the spring and its point of connection to the dog to a straight line that bisects the axis of the dog, and an anchorage for one end of the spring that may be adjusted to change the angle of bisection through the axis of the dog.

3. In a typewriting machine having a typing system tilted to incline the printing plane of the type-faces rearwardly, carriage-feeding mechanism operating in a plane parallel thereto, a swinging frame mounted to move substantially perpendicularly to said plane and carrying at its forward end a universal bar, means adjustable on the frame to operate the carriage-feeding mechanism, and other means including a stop adjustable to the frame to effect the adjustment of the universal bar to the typing system.

4. In a typewriting machine having a main frame, a carriage frame having an inclined rear wall, a platen-carrying frame movable longitudinally in the carriage frame, an angular bracket fixed to said inclined rear wall to present a vertical face, a stud rotatable in the bracket, a drum revoluble on said stud, a coiled flat spring having its ends attached respectively to said stud and the inner wall of the drum, a worm-and-gear drive for the stud by which the spring may be tensioned, and a flexible tape fixed at one end on the drum and at the other end to said platen-frame.

5. In a typewriting machine having a main frame, a carriage frame having an inclined rear wall, a platen-carrying frame movable longitudinally in the carriage frame, the upper edges of the platen-frame ends having right angle flanges, a bracket fixed to said inclined wall to present a vertical face, a spring motor carried by the bracket on a horizontal axis, a flexible connection between said motor and the platen-frame to pull said frame in one direction, an escapement-wheel, a spur gear combined therewith, said wheel and gear being rotatably mounted on the inclined wall, a bell-crank lever pivoted to each of the platen-frame ends, a rack supported by said bell-crank levers to engage said gear, and carriage-release levers pivoted on the platen axis, said levers operatively engaging the bell-crank levers and having their finger-pieces extending through openings in the flanged edges of the platen-frame ends and being normally level with the upper surfaces of the flanges.

6. In a typewriting machine having a main frame, a carriage frame, a slidable platen-carrying frame thereon, a spring motor to draw the platen-frame in letter-space direction, a combined escapement-wheel and gear, a rack engageable with the gear, lever arms pivoted on the ends of the platen-frame to support the rack, said platen-frame ends having flanged edges, carriage-release levers pivoted on the platen shaft to operatively engage said lever arms, and finger-pads on the upper ends of the last-named levers, said pads extending into openings in the platen-frame end flanges normally level with the upper surface thereof, said flanges acting as guards to prevent inadvertent contact with the pads.

7. In a typewriting machine, the combination with a main frame, a carriage-supporting frame, a platen-frame, means for moving the platen-frame in letter-space direction, a universal bar, and an escapement-wheel, of a dog-rocker pivoted in the carriage-supporting frame, a holding dog carried rigidly on the rocker, a stepping dog pivoted on the rocker, said stepping dog having an extending arm, a spring engaging said arm, a post connected with the other end of said spring, said post being so mounted as to hold the spring adjustable at various angles relative to the plane of the stepping dog, a stop against which the stepping dog contacts when engaged by a tooth of the escapement-wheel, a stop limiting the movement of the rocker, a spring pressing the rocker against its stop, an arm on said rocker, and adjustable means actuated by the universal bar to strike the arm and thereby oscillate the rocker at each full movement of a type-bar carried in the machine.

ALFRED G. F. KUROWSKI.